US008179066B2

(12) United States Patent
Terörde (10) Patent No.: US 8,179,066 B2
(45) Date of Patent: May 15, 2012

(54) METHOD FOR CONTROLLING A LOAD WITH A PREDOMINANTLY INDUCTIVE CHARACTER AND A DEVICE APPLYING SUCH A METHOD

(75) Inventor: Gerd Terörde, Hamminkein (DE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 509 days.

(21) Appl. No.: 12/521,381

(22) PCT Filed: Dec. 20, 2007

(86) PCT No.: PCT/BE2007/000128
§ 371 (c)(1),
(2), (4) Date: Jun. 26, 2009

(87) PCT Pub. No.: WO2008/077203
PCT Pub. Date: Jul. 3, 2008

(65) Prior Publication Data
US 2010/0109582 A1 May 6, 2010

(30) Foreign Application Priority Data

Dec. 27, 2006 (BE) .................................. 2006/0646

(51) Int. Cl.
*H03K 5/00* (2006.01)
(52) U.S. Cl. ............... 318/400.2; 318/400.26; 318/801; 363/17; 363/34; 363/55; 363/56.06

(58) Field of Classification Search ............... 318/400.2, 318/400.26, 801; 363/17, 34, 55, 56.06
See application file for complete search history.

(56) References Cited

U.S. PATENT DOCUMENTS

| 4,032,832 | A | 6/1977 | Miller |
| 5,594,632 | A * | 1/1997 | Barrett ........................... 363/44 |
| 5,668,707 | A * | 9/1997 | Barrett ........................... 363/44 |
| 6,232,731 | B1 | 5/2001 | Chapman |
| 6,864,644 | B2 * | 3/2005 | Kernahan ....................... 315/307 |
| 7,692,938 | B2 * | 4/2010 | Petter ............................. 323/361 |
| 2008/0074911 | A1 * | 3/2008 | Petter ............................. 363/65 |
| 2010/0201197 | A1 * | 8/2010 | Shires et al. .................... 307/73 |

FOREIGN PATENT DOCUMENTS
FR 2 641 912 A1 7/1990
GB 1 483 201 A 8/1977

* cited by examiner

*Primary Examiner* — Walter Benson
*Assistant Examiner* — Erick Glass
(74) *Attorney, Agent, or Firm* — Bacon & Thomas, PLLC (57) ABSTRACT

Method for controlling a load with a predominantly inductive character, whereby in order to feed a phase of the above-mentioned load (3), use is made of at least two connected output voltages, derived from one or several power electronic inverters (11,12;34,35,36), with a given period for switching, modulation or sampling, characterized in that the waveforms of the output voltages concerned are different or have been shifted in time, and in that they are supplied to the load (3) via a differential-mode device (6), whereby during every complete above-mentioned period, at least one of the above-mentioned output voltages is maintained constant and thus is not connected.

18 Claims, 6 Drawing Sheets

METHOD FOR CONTROLLING A LOAD WITH A PREDOMINANTLY INDUCTIVE CHARACTER AND A DEVICE APPLYING SUCH A METHOD

BACKGROUND

A. Field

The present invention concerns a method for controlling a load with a predominantly inductive character, for example an electric motor, a generator or the like, whereby in order to feed a phase, of the above-mentioned load, use is made of at least two switched output voltages, applied by one or several power electronic inverters with a given switching, modulation or sampling period, such as an inverter with a direct-current interstage circuit, a buck or boost inverter or the like.

B. Related Art

In general, two basic types of inverters with a direct-current interstage circuit are known, i.e. a Voltage Source Inverter (VSI) employing a DC-link capacitor and providing a switched output voltage, and a Current Source Inverter (CSI), employing a DC-link inductance and providing a switched current waveform at its outputs. Further in the description, only voltage source inverters will be considered.

In a typical voltage source inverter, every inverter leg can be simplified into a 2-way switch applying a switched voltage waveform to a load, as either the positive or the negative DC bus voltage is applied for a short time to one of the phases of said load.

If the negative bus voltage is applied to a certain phase, the current of this phase will decrease, and vice versa, the phase current will usually increase if a positive voltage is applied.

By making use of modulation techniques such as pulse width modulation (PWM) or of known techniques such as hysteresis control, it is possible to provide an average voltage which, within every PWM period, is equal to a reference voltage. Since PWM frequencies are much higher than the frequency of said reference voltage, the reference voltage is reflected by the fundamental wave of the switched pulse pattern. Apart from this fundamental wave, the voltage spectrum at for example the terminals of a motor comprises many higher harmonics. In electrical drive application, this varying output generates additional current harmonics which increases the torque ripple yielding speed variations increase, as well as the losses, which results in motor heating.

A known method for reducing the current ripple resulting from the switched voltage waveform consists in making the switching frequency of the inverter rise. However, the switching frequency is limited to a maximum value which depends both on the power electronics and on the control unit. Moreover, also the losses of the inverter increase as a result of an increasing switching frequency.

Another well-known measure for reducing the current ripple is to provide a choke at the inverter output, or a sinus filter which is formed of the combination of a choke and a capacitor.

Disadvantages of applying a choke at the inverter output are the high cost price, additional losses and the voltage drop. Especially with high-frequency applications such as high-speed drives, the latter disadvantage is important, since the voltage drop depends on the frequency of the fundamental wave.

Parallel converter supply is already known, which is applied for restricting the power rating of every converter in parallel and whereby the legs of the respective inverters are connected directly parallel to one another.

A disadvantage of such a system is that the output voltages of the parallel inverter legs must be identical, since any difference of the output voltage, such as a shift of the PWM-pulses, may cause a dangerously high circulation current or short-circuit within the parallel connection.

In other known systems, every parallel inverter is provided with a separate choke, such that the voltage pulses of each of these respective parallel output legs of the inverters can be shifted.

A known PWM strategy for the parallel inverter output leg consists in applying the same voltage waveform, but whereby the voltage pulses are shifted over half a PWM period.

The major disadvantages of such a strategy consist in that every choke is loaded with a magnetic field which is generated by the full output current of the inverter and in that the switching frequency cannot be reduced.

Other disadvantages of such known methods consist in that the harmonic content is only slightly reduced and in that there is a high voltage drop at high fundamental frequencies.

Another disadvantage of such known methods consists in that the above-mentioned chokes, at high powers, are very sizeable and expensive.

In a previous patent application of the same applicant has already been described a device which remedies some of the aforesaid disadvantages, which device is designed as a differential-mode device which makes sure that the major part of the flux which is generated by the current in one of the inverter legs is counteracted by a flux which is generated by the current in one or several other inverter legs.

Compared to a standard choke with an identical permissible power, the resulting magnetic flux is very low, resulting in low-cost differential-mode devices with small dimensions.

SUMMARY OF THE INVENTION

The present invention aims to provide a method for controlling a load with a predominantly inductive character, whereby the switching frequency of the inverter is reduced, the current harmonics are reduced and/or other advantages are obtained over the conventional method that is applied for controlling a load.

To this end, the present invention concerns a method for controlling a load with a predominantly inductive character, whereby in order to feed a phase of the above-mentioned load, use is made of at least two switched output voltages, applied by one or several power electronic inverters with a given switching, modulation or sampling period, whereby the waveforms of the output voltages concerned differ or shift in time and whereby they are applied to the load via a device designed as a differential-mode device, whereby during every complete above-mentioned period, at least one of the above-mentioned output voltages is kept constant and thus is not switched.

A major advantage of a method according to the invention consists in that the switching frequency of the inverters can be considerably reduced, as a result of which the losses in this inverter are reduced.

Another advantage of a method according to the invention for controlling a load with a predominantly inductive character is that the current harmonics are reduced, such that the load efficiency increases and there will be less load heating.

An additional advantage of a method according to the invention is that the common-mode voltage will be considerably lower, as a result of which for example problems related to electromagnetic compatibility (EMC) are reduced.

The present invention also concerns a device which is for the application of a method as described above, for controlling a load with a predominantly inductive character, whereby this device comprises one or several power electronic inverters with a given switching, modulation or sampling period, to provide at least two switched output voltages, whereby this device comprises at least one differential-mode device onto which the above-mentioned inverter or inverters is or are connected so as to feed a phase of the above-mentioned load and in that the above-mentioned inverter or inverters is or are provided with a control which makes sure that the waveforms of the output voltages concerned differ or shift in time and in that during every complete above-mentioned period, at least one of the above-mentioned output voltages is kept constant and thus is not switched.

The above-mentioned differential-mode device is preferably provided with one or several inductor components such as chokes, transformers, toroid transformers, ferrite rings, iron cores, common-mode chokes, current-compensated chokes or the like, having two or more parallel windings, such that it becomes possible to dampen the differential mode of the voltage, of the current respectively, of two or more inverter legs connected to this device.

DESCRIPTION OF THE DRAWINGS

In order to better explain the characteristics of the present invention, the following preferred methods according to the invention are given hereafter by way of example only, without being limitative in any way, with reference to the accompanying drawings, in which.

DETAILED DESCRIPTION OF THE EMBODIMENTS

Figure 1:
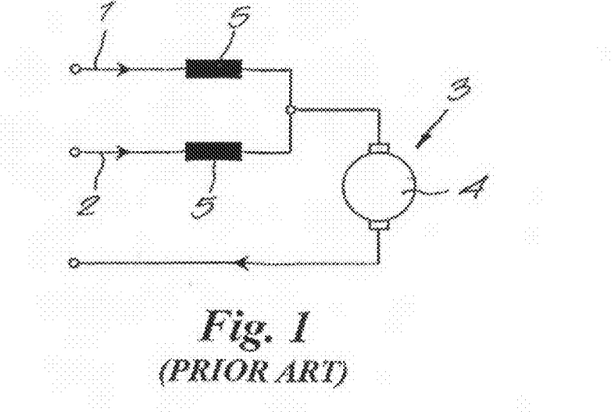
FIG. 1 represents a known arrangement of two parallel inverter legs.

FIG. 1 represents a known arrangement whereby the output legs 1 and 2 of two inverters that are not represented in the figures are connected in parallel and are connected to a load 3 with a predominantly inductive character, whereby this load 3 in this case consists of a motor 4, and in particular of one phase of this motor 4.

In each of the output legs 1 and 2 of the respective inverters is, as is known, each time provided a choke 5.

As already described in the introduction, such a known arrangement has numerous disadvantages, such as a high switching frequency, a limited reduction of the harmonic content, a large voltage drop in case of high fundamental frequencies, a strong magnetic field in every choke as this field is generated by the entire output current of the inverters and high-cost chokes 5 with large dimensions, in particular in case of high powers.

Figure 2:
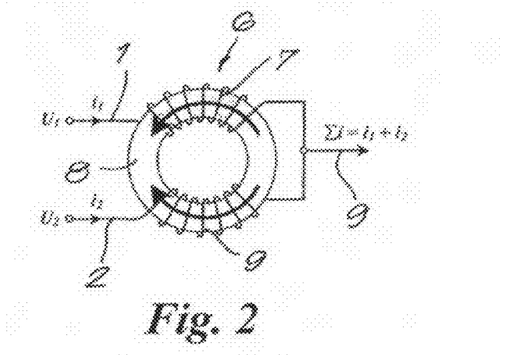
FIG. 2 represents a winding scheme of a differential-mode device.

FIG. 2 represents a basic arrangement of a differential mode device 6, as described in a previous patent application of the same applicant, whereby two anti-parallel windings 7 are provided on a common magnetic core 8, such as an iron core.

Both above-mentioned windings 7 are used to connect the two inverter legs 1 and 2, providing respective voltages $U_1$ and $U_2$.

The far ends of the windings 7 are connected via a common conductor 9 to one phase of a load which may consist of an active or passive grid with an inductive character, for example a motor phase. According to Kirchoff's law, the load current i flowing through the conductor 9 equals the sum of the inverter currents $i_1$ and $i_2$ provided via the respective inverter legs 1 and 2.

Figure 3:
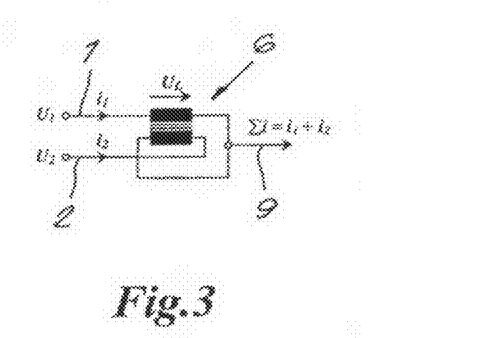
FIG. 3 represents an equivalent circuit of the winding scheme according to FIG. 2.

FIG. 3 represents the same arrangement as in FIG. 2 by means of a simplified equivalent circuit.

For a parallel power control, the currents of the two inverter legs 1 and 2 which generate a field in the magnetic core 8 must be equal. Depending on the current direction, the flux that is generated by the windings 7 will be parallel or opposite.

With an equal output current of the two inverters and a winding ratio of 1:1 with a 100% magnetic coupling, both fluxes will neutralize each other entirely, and the resulting magnetic field in the differential-mode device 6 will be equal to zero.

In the presence of a differential-mode current however, whereby differs from $i_2$, there will be a magnetic flux in the magnetic core 8, as a result of which the choke will function as an induction coil against this unwanted current.

Whereas with a conventional single-phase choke, a magnetic field is generated by the total phase current, the magnetic field of the differential-mode devices 6 is mainly generated by the difference in the output currents $i_1$ and $i_2$ of the respective inverters connected in parallel.

This differential-mode current (i.e. current difference) can only amount to a fraction of the total phase current. Since the iron core does not see the fundamental components of the inverter current and inverter voltage, the iron core can be dimensioned considerably smaller than a standard choke or transformer as is used for an identical admissible power.

In a test arrangement, for example iron cores of 2 kVA chokes are used to feed a 300 kW motor with parallel power supply, whereby the output legs 1 and 2 of different is inverters are connected in parallel.

However, such an arrangement is not obvious, since the differential-mode device 6 becomes saturated and thus will no longer work correctly at a relatively low differential-mode current level.

As is illustrated by means of FIGS. 4 to 10, many different arrangements are possible. The basic principle always remains the same, however, whereby:

with identical output currents of the inverter legs 1 and 2 feeding one and the same phase of the load 3 and when neglecting leakage losses, the magnetic field in the differential-mode device 6 is zero;

the output voltage of the differential-mode device 6 is the sum of the respective input voltages $U_1$ and $U_2$ of this differential-mode device 6, divided by the number of inputs.

The differential-mode devices 6 that are used for parallel power supply can be realised by making use of one or several inductor components such as chokes, transformers, toroids, ferrite rings, iron cores, "common-mode" chokes, chokes with current compensation or the like. Such induction components have two or more parallel windings (depending on the number of parallel inverter legs) to dampen the differential-mode of the voltage, current respectively.

Figure 4:
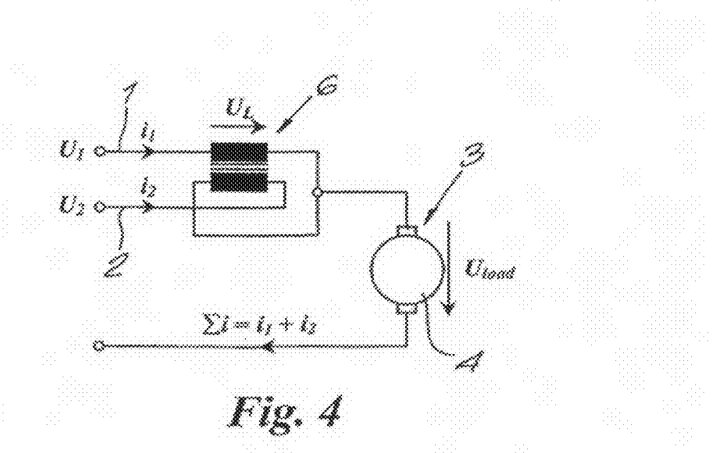
FIG. 4 is an arrangement by way of example of a differential-mode device according to FIG. 3.

FIG. 4 represents an exemplary arrangement of a differential-mode device 6 according to FIG. 3, which is connected to a load 3 in the form of a motor phase, and which is fed by two inverter legs 1 and 2 which supply the respective output voltages $U_1$ and $U_2$.

In this example, the differential-mode device 6 as represented in FIG. 2 consists of two antiparallel wound windings 7 round a magnetic core 8, in which the magnetic field that is generated by the windings 7 equals zero when the two output currents $i_1$ and $i_2$ of the respective inverters are equal.

Since the anti-parallel wound windings 7 are connected to one and the same flux, the voltage drops over the windings 7 are inverse. If the resistive voltage drop, the leakage flux, the capacitive coupling and other parasitic effects are neglected, one can say that the output voltages $U_1$ and $U_2$ of the respective inverter legs 1 and 2 will be equal to:

$$U_1 = U_{load} + U_L \quad (1)$$

$$U_2 = U_{load} - U_L \quad (2)$$

$U_L$ hereby represents the voltage drop occurring over the winding 7 of the first inverter leg 1, whereas $U_{load}$ represents the voltage applied to the motor phase.

According to (1)-(2), the sum of the output voltages of the respective inverters equals:

$$U_1 + U_2 = 2 \cdot U_{load} \quad (3)$$

From what precedes follows that the voltage drop over the load equals:

$$U_{load} = \frac{1}{2}[U_1 + U_2] \quad (4)$$

This formula can also be derived from the following system of equations, whereby $U_L$ represents the self-induction voltage of the choke and $L_d$ the self-induction coefficient of the choke:

$$\left.\begin{array}{l} U_1 = U_{load} + U_L \\ U_2 = U_{load} - U_L \\ U_L = L_d \frac{d}{dt}[i_1 - i_2] \end{array}\right\} \Rightarrow U_{load} = \frac{1}{2}[U_1 + U_2]$$

From what precedes also follows that the self-induction voltage over the choke equals:

$$U_L = \frac{1}{2}[U_1 - U_2] \quad (5)$$

Figure 5:
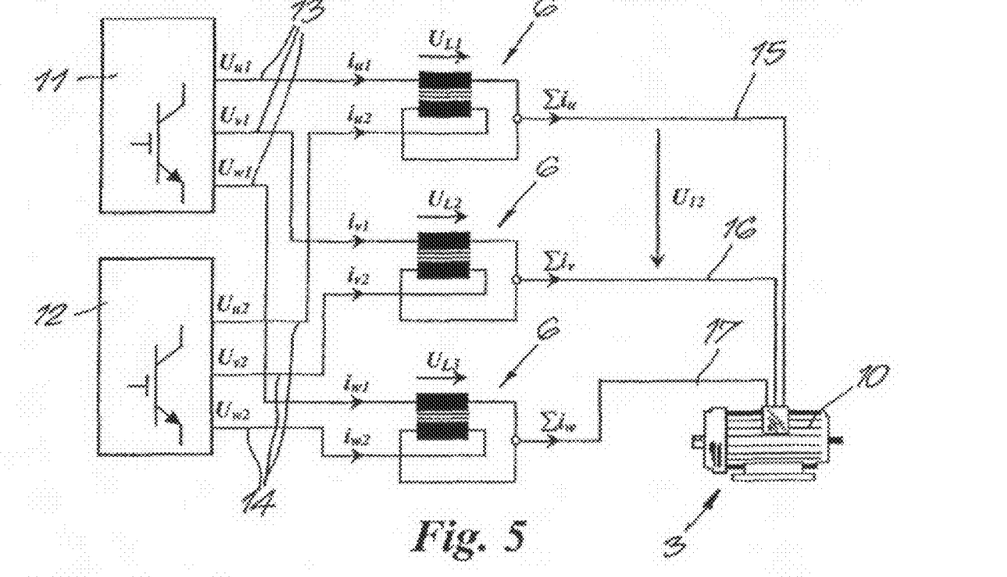
FIGS. 5 and 6 represent variants according to FIG. 4.

FIG. 5 shows an example of a device according to the invention with three differential-mode devices 6 for a 3-phase application. In this example, a multi-phase load in the form of an electric machine, which in this case consists of a 3-phase motor 10, is fed by two 3-phase inverters 11 and 12 which are also part of the device according to the invention.

To this end, each time two output legs 13 and 14 of the respective inverters 11 and 12 are connected in parallel by means of a separate differential-mode device 6, and each of the three separate differential-mode devices 6 feeds a respective motor phase 15, 16 or 17.

The above-mentioned power electronic inverters may hereby be either or not connected to a common DC bus voltage.

The working principle of the differential-mode devices 6 and the resulting equations are similar to those of the preceding example of FIG. 4.

Indeed, for this example is true:

$$U_{Motor} \approx \frac{1}{2}\begin{bmatrix} U_{u1} + U_{u2} \\ U_{v1} + U_{v2} \\ U_{w1} + U_{w2} \end{bmatrix}$$

According to the invention, the above-mentioned inverters 11 and/or 12 comprise a control that makes sure that the waveforms of the output voltages concerned of the respective inverter legs 13 and 14 that are connected to one and the same differential-mode device differ in time or are shifted in time and that, during every above-mentioned full period, at least one of these above-mentioned output voltages is kept constant and thus is not switched.

Figure 6:
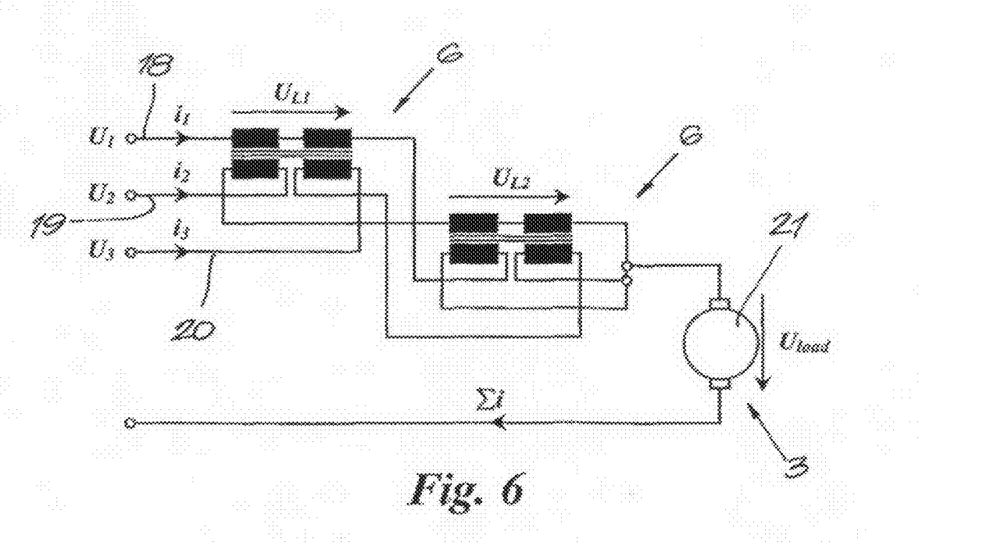

According to the same principle, it is also possible to connect more than two inverter legs in parallel, as is for example represented in FIG. 6, which represents an arrangement by way of example of two differential-mode devices 6 that are connected to three inverter legs 18, 19 and 20 and that feed one phase of a motor 21.

In this example, the following system of equations is true:

$$\left.\begin{array}{l} U_{L1} = L_{d1}\dfrac{d}{dt}\left[i_1 - \dfrac{i_2}{2} - \dfrac{i_3}{2}\right] \\ U_{L2} = L_{d2}\dfrac{d}{dt}\left[i_2 - \dfrac{i_1}{2} - \dfrac{i_3}{2}\right] \end{array}\right\} \Rightarrow U_{Load} = \frac{1}{3}[U_1 + U_2 + U_3] \quad (6)$$

For this example, also the following equations are true:

$$U_{L1} = \frac{2}{3}[U_1 - U_3] \text{ and } U_{L2} = \frac{2}{3}[U_2 - U_3]$$

In these equations, $U_{L1}$ and $U_{L2}$ represent the self-induction voltages of the respective chokes of each of the differential-mode devices 6, whereas the voltages $U_1$, $U_2$ and $U_3$ represent the output voltages of the respective inverters.

Variants of the arrangement in FIG. 6 can for example be provided with more than two differential-mode devices 6 or with other winding distributions for the differential-mode devices 6.

It is also possible to provide differential-mode devices 6 with only one iron core to decouple the inverters, as a result of which a parallel power supply is made possible.

According to a special characteristic of the invention, the differential-mode device comprises windings round an iron core with more than one magnetic flux path.

Figure 7:
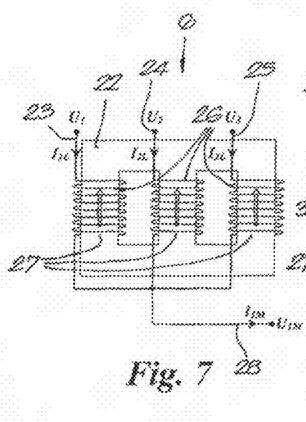
FIG. 7 represents a variant of a winding scheme according to FIG. 2.
Figures 8, 9:
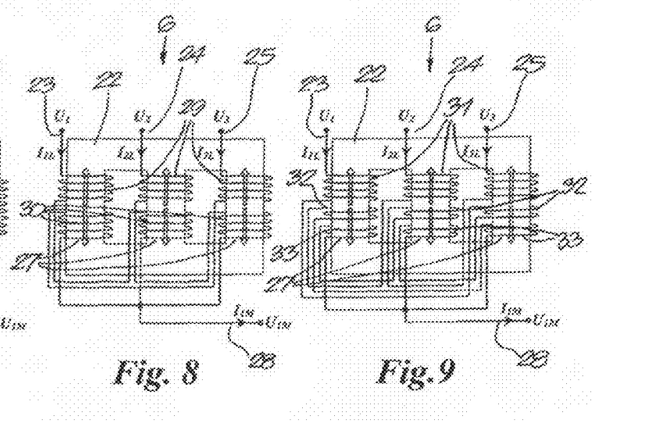
FIGS. 8 and 9 represent variants according to FIG. 7.

FIGS. 7 to 9 represent three different winding schemes which each result in the same voltage equation for the load as the above-mentioned equation (6) from the example in FIG. 6, on condition that a winding ratio 1:1:1 is taken as a basis and that leakage losses are neglected.

In each of the figures, the differential-mode device 6 comprises a 3-phase transformer 22 that is fed by three output legs 23-25 of three separate inverters that are not represented in the figures.

In the example of FIG. 7, the far ends of the windings 26 round the respective transformer legs 27 are connected in parallel and they are connected via the common conductor 28 to a load 3 with a predominantly inductive character, such as a motor phase.

In the arrangement of FIG. 8, two separate windings 29 and 30 are provided round each transformer leg 27, a first winding 29 onto which is connected an output leg 23-25 of a respective inverter, and a second winding 30 which is connected with one far end to a free end of an above-mentioned first winding 29 respectively, and whereby the other far ends of the second windings 30 are connected in parallel so as to supply a load.

The connections between the respective first and second windings 29 and 30 on the transformer legs 27 are in this case made such that every first winding 29 is connected to a respective transformer leg 27 with a second winding 30 round another transformer leg 27.

In the arrangement represented in FIG. 9, three separate windings 31-33 are provided round each of the transformer legs, whereby these windings 31-33 are connected to one another in such a manner that every output current supplied by the respective inverters flows through three windings, whereby these three windings are each provided round another transformer leg 27.

Figure 10:
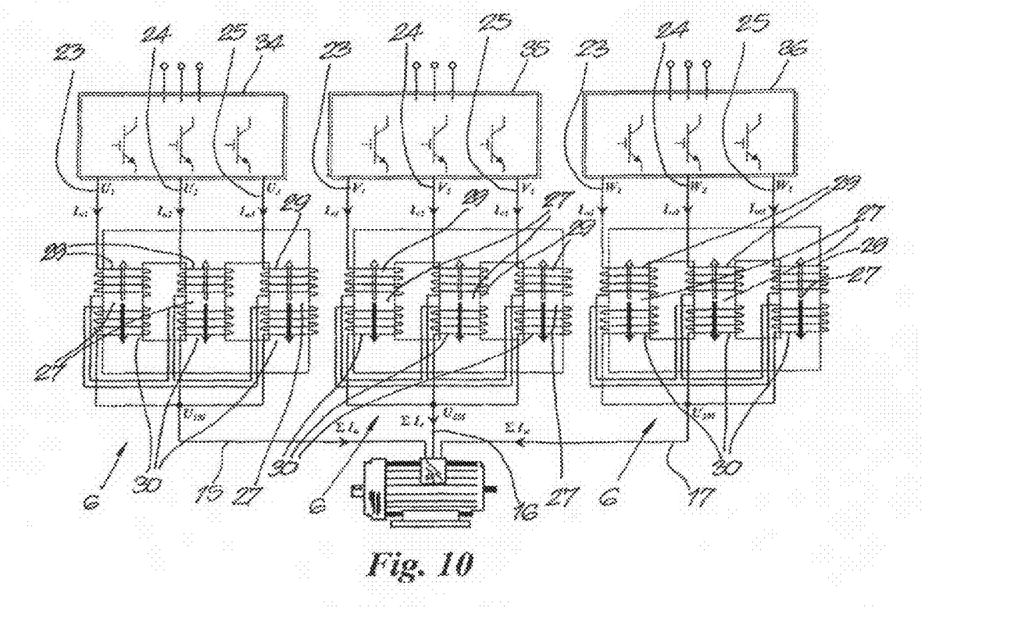
FIG. 10 is an arrangement by way of example of a differential-mode device for a 3-phase application.

An example of an application of a differential-mode device 6 according to FIG. 8 is represented in FIG. 10, which shows a device according to the invention feeding a load.

In this example, a 3-phase load 3 in the form of a motor 10 is fed by three 3-phase inverters 34-36, namely via three differential-mode devices 6 which are embodied as the example in FIG. 8 with two windings 29 and 30 round each transformer leg 27.

To this end, every 3-phase inverter 34-36 is used to feed another motor phase 15-17, but it is clear that the output legs 23-25 of the inverters 34-36 can also be combined in other ways, for example by using a first phase 23 of every inverter 34-36 to feed one motor phase 15, by using the second inverter phases 24 to feed the second phase 16 of the load 3 and by feeding the third load phase 17 with the third phases of the respective inverters 34-36.

In all the applications of the differential-mode device 6, the voltage that is applied to every phase of the load equals the sum of the output voltages of the respective inverters which feed the differential-mode device 6 concerned, divided by the number of inverter outputs which are connected to this differential-mode device 6.

The most obvious way to approach a desired reference voltage for the load consists in applying the same voltage to all parallel inverter legs, such that a conventional power supply is obtained without any additional disadvantages.

The method according to the invention for controlling a load with a predominantly inductive character consists in that the wave shapes of the output voltages of the respective inverter legs which are connected to a common differential-mode device for feeding a phase of the load are different or are shifted in time and in that, during every complete switching, modulation or sample period, at least one of the above-mentioned output voltages is maintained constant and thus is not switched, by means of an above-mentioned control.

According to a preferred characteristic of the invention, during every complete switching, modulation or sample period, maximally one of the output voltages which are connected to the same phase of the load is switched.

During that same period, all other inverter legs which are connected to the same differential-mode device supply a constant output voltage.

Figure 11:
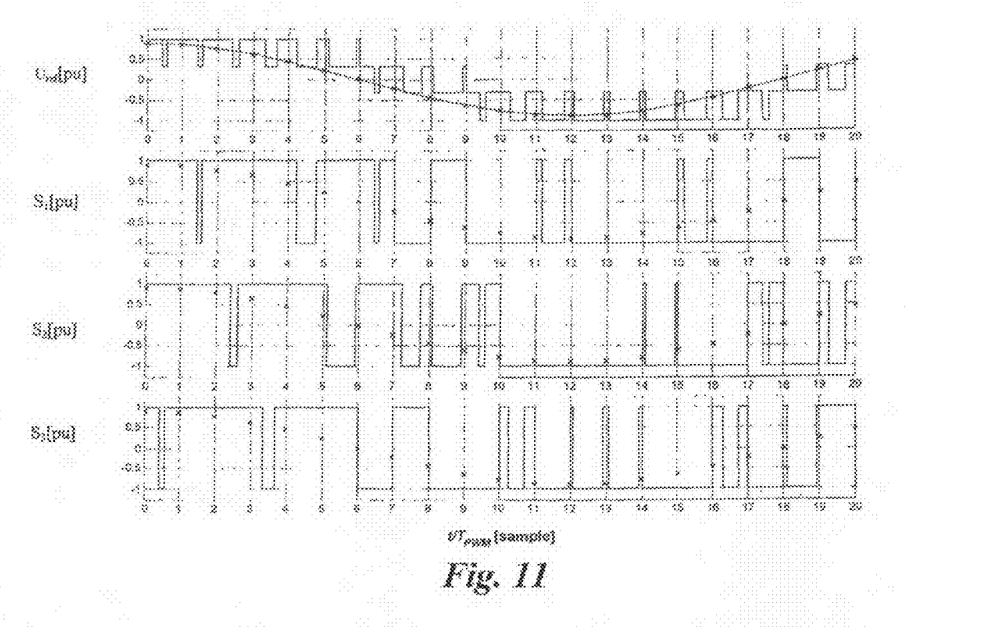
FIG. 11 represents switching logics applied in a method according to the invention.

FIG. 11 represents an example for one phase of the load which is fed by three inverter legs.

The top diagram represents the reference voltage $u_{ref}$ as a dashed line and it represents the resulting phase voltage supplied to the load as a full line.

The three bottom diagrams again represent the reference voltage as ticked, and the switching logic $S_1$, $S_2$ and $S_3$ of a respective inverter leg is each time represented as well.

This example gives a symmetrical PWM which starts every switching cycle with a "high" state (i.e. with a positive output voltage of the respective inverter leg).

The horizontal axis represents the time t divided by the PWM period $T_{PWM}$.

During the first sample or PWM period, the output voltages of the topmost two inverter legs are "high", whereas the third inverter leg is switched briefly "low" during this sample or PWM period.

During this sample or PWM period, the voltage that is applied to the phase of the load by the differential-mode device will be "high", and it will be temporarily switched to a lower voltage level.

In the next five sample or PWM periods, maximally one of the output legs of the inverters that is connected to the differential-mode device concerned will be switched, whereas all the other output legs will supply a continuously "high" voltage.

During the next three sample or PWM periods, each time one of the output voltages will be continuously "low", whereas another output voltage is continuously "high" and a third output voltage will be temporarily switched from "high" to "low" as of a "high" state.

During the next eight sample or PWM periods, two output voltages will each time be maintained continuously "low", whereas a third output voltage in this sample or PWM period will be temporarily switched from "high" to "low".

Then, there will be again a number of sample or PWM periods in which one of the output voltages is continuously "low", whereas a second output voltage is continuously "high", and a third output voltage will be temporarily switched "low" as of a "high" state.

In this way is obtained a reference signal, as represented by means of a dashed line in the top diagram of FIG. 11, whereby the voltage is switched between a discrete number of voltage levels, in this case four voltage levels.

According to the invention, instead of a symmetrical PWM starting every period "high", also other PWM strategies can be applied, such as a symmetrical PWM starting every period "low", an "edge aligned PWM", an asynchronous and synchronous PWM or the like.

The preferred characteristic of the invention, being that during every sampling period maximally one inverter leg is switched, can be implemented in each of said switching strategies.

In real-time applications, additional features are added such as dead-time delay, minimum pulse detection and the like.

In all the following examples, the output voltage of an inverter leg will be in proportion to a reference signal $x_{ref}$, whereby $x_{ref}$ is situated within the range $-1 \leq x_{ref} \leq 1$.

A reference signal "+1" hereby corresponds to an inverter leg which continuously switched on the positive DC-bus voltage, whereas a reference signal "−1," corresponds to an output voltage of an inverter leg that is equal to the negative DC bus voltage.

In multi-phase applications, without any neutral connection, the interaction of the different phases can be used.

Instead of using a separate inverter for every phase, a complex reference signal can be processed as a whole.

Depending on the application, such a technique may offer additional advantages. A typical example that is described in literature is "Space Vector Modulation" (SVM) for electric drives.

A further reduction of the switching frequency can be obtained according to the invention by adding a common-mode voltage to all the phases, in such a manner that at least one of the phases is continuously high or low during a complete switching, modulation or sample period (i.e. there is no switching action in at least one phase).

Such a common-mode voltage variation is not seen by the load, since it has no influence on the line-to-line voltages.

Figure 12:
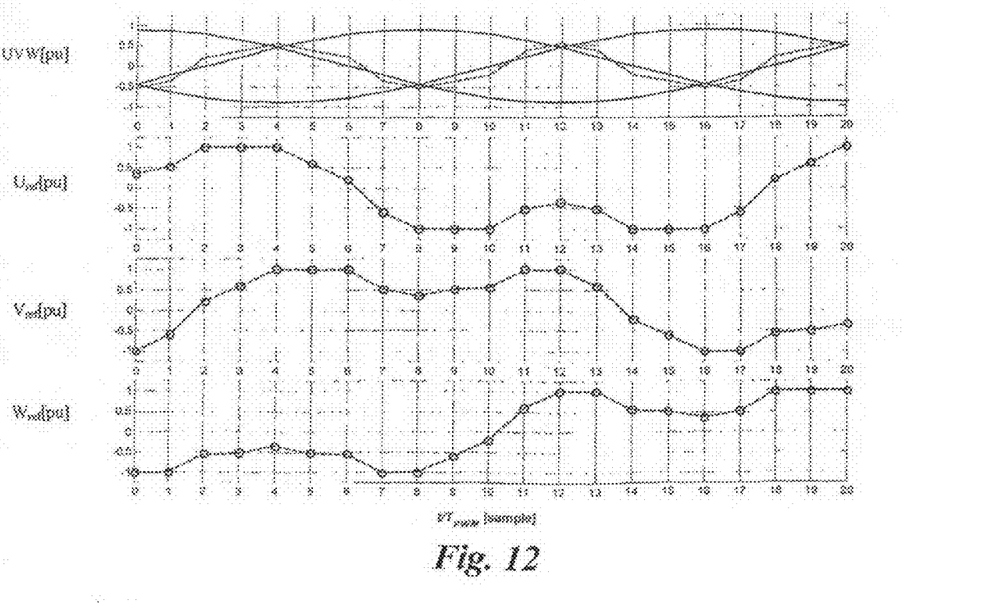
FIG. 12 represents the common-mode voltage in a 3-phase application.

FIG. 12 shows an example of the voltage shift for a 3-phase application.

The top diagram of this figure shows three sinusoidal reference signals U, V and W, shifted over 120 degrees.

Adding the "common-mode" voltage, represented by way of example as a dashed line, results in reference signals $U_{ref}$, $V_{ref}$ and $W_{ref}$, as represented in the lower three sub plots.

In this example, a reference that is equal to +1 or −1 does not lead to a switching action.

Consequently, the effective switching frequency is considerably reduced, since during every switching, modulation or sample period, there will be switching actions in at most two inverter legs.

In this example, for example each of the inverter outputs that are used to feed phase U during the third, fourth, fifth, ninth, tenth, eleventh, fifteenth, sixteenth, seventeenth, twenty-first, twenty-second and twenty-third sample or PWM period will be maintained constant.

Analogously, by adding the common-mode voltage to the sinusoidal reference signals for the respective phases V and W, one makes sure that these phases as well are in a state +1 or −1 during certain sample or PWM periods, which implies that none of the output voltages of the respective inverter legs that are connected to the differential-mode device feeding the phase V or W concerned are switched.

A further reduction of the general switching frequency can be obtained by applying known techniques such as minimum pulse detection and the like.

The present invention also offers a special switching strategy that offers additional advantages for applications in which the above-mentioned output voltages are situated in the low modulation range, whereby the voltage reference is small compared to the DC bus voltage.

The major advantages are that the non-linear characteristics of the inverter, such as the dead-time effect, are counteracted, and that the switching frequency is reduced.

In an analogous way as in the preceding example from FIG. 12, the main idea of this switching strategy is to add a common-mode voltage to all phases, in such a way that, during every switching, modulation or sample period, there will be switching actions in maximally one of the parallel inverter legs.

During that same PWM period, all other inverter legs are at the same output voltage, which implies that all these other inverter legs are continuously "high" or continuously "low" and that there is no mixing of constantly high and constantly low voltages.

Figure 13:
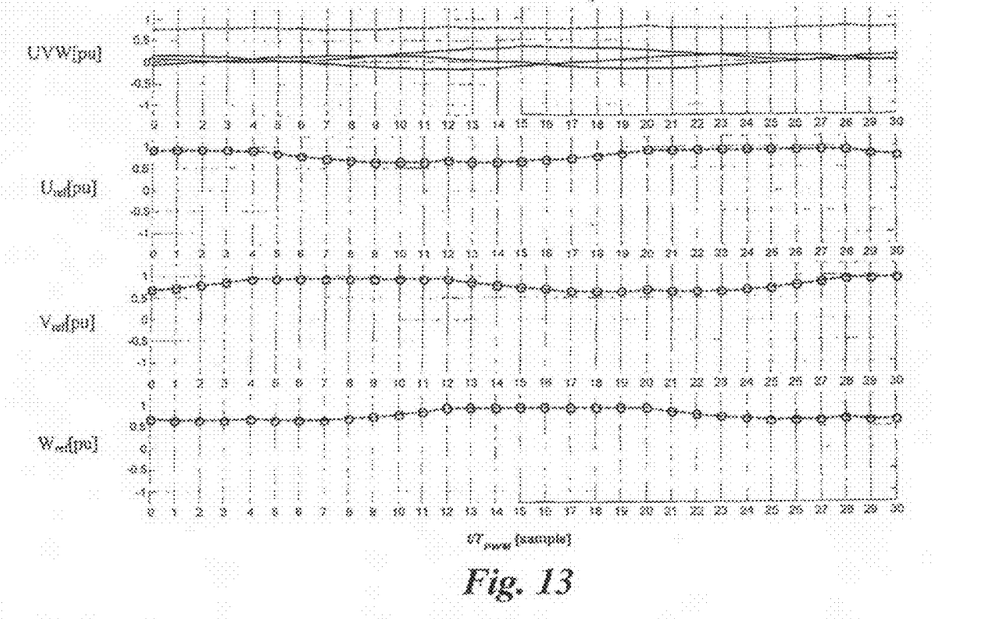
FIG. 13 represents a switching strategy in the low-modulation range.

An example of such a 3-phase application is represented in FIG. 13, which shows an analogous construction as in FIG. 12, and in which the represented reference voltages are used in the low modulation range.

Figure 14:
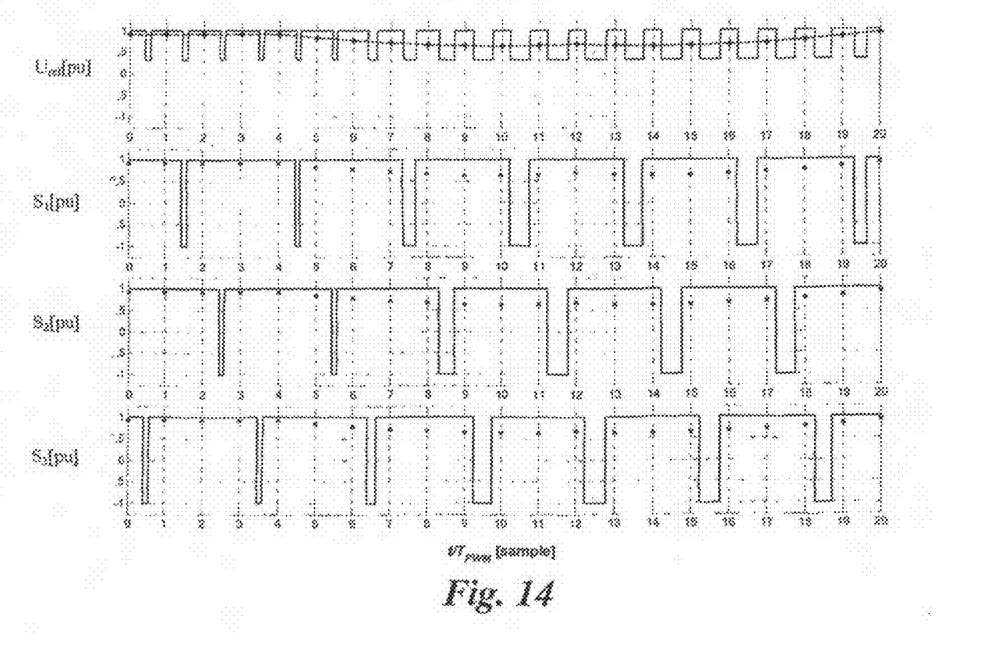
FIG. 14 represents a voltage waveform in the low-modulation range.

In FIG. 14 for example, the switching logic of three inverter legs is represented which are used to feed one phase of the load, in this case phase U.

Figure 15:
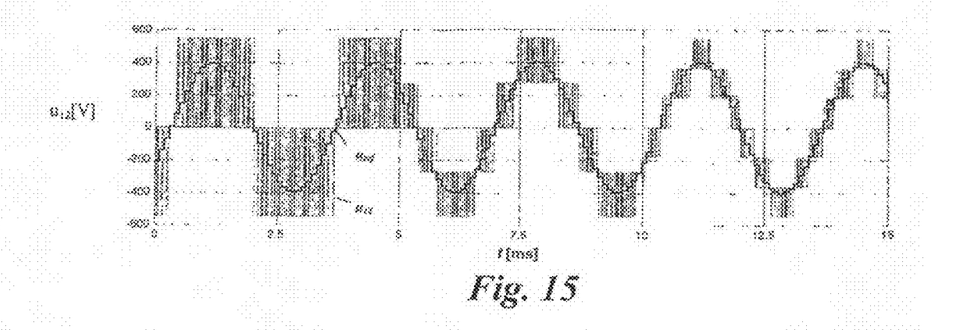
FIG. 15 represents a reference voltage for different systems and the resulting motor input voltage in the first phase of a 3-phase electric machine.
Figure 16:
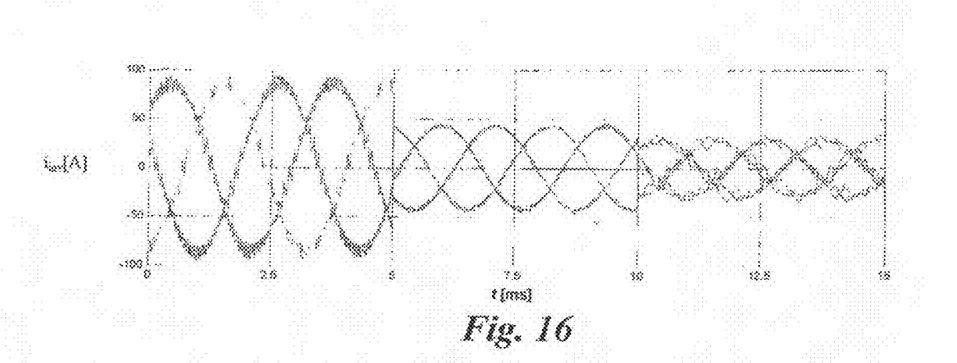
FIG. 16 represents an output current of an inverter for a 3-phase application for different systems.
Figure 17:
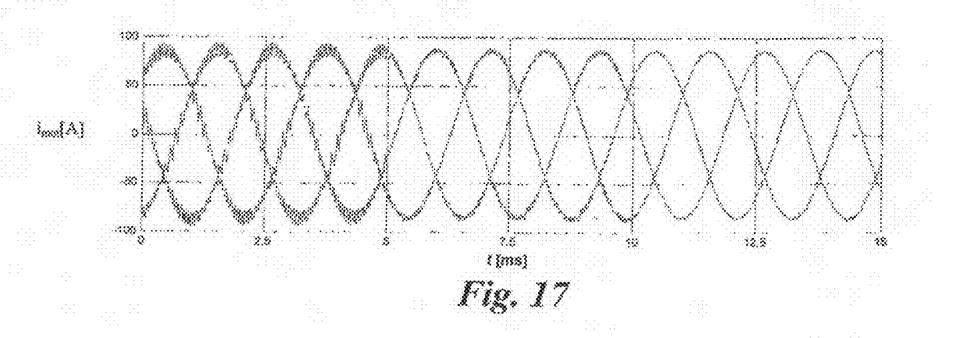
FIG. 17 represents an example, for different systems, of the input current of a 3-phase electric machine.

FIGS. 15 to 17 are examples of voltage waves of a 3-phase application. In this example, a 3-phase electric machine is subsequently fed by one, two or three inverters respectively that are connected in parallel by means of differential-mode devices and whereby non-linear characteristics are neglected.

FIG. 15 shows the reference voltage and input voltage $u_{12}$ of the motor between the first and the second phase, as a function of time t.

Typically, the line voltage of a 3-phase motor that is fed by a single 3-phase inverter consists of three different states, namely zero, a positive and a negative DC bus voltage.

Thus, it is possible with the present invention to apply a line voltage which consists of more than two states.

Consequently, the voltage gets more sinusoidal, which implies that the voltage becomes more similar to the reference voltage.

In the given example, the number of states n equals:

$$n = 2 \cdot k + 1 \qquad (6)$$

k hereby represents the number of parallel inverter legs.

FIGS. 16 and 17 respectively show the output current $i_{inv}$ of the inverter and the input current $i_{mot}$ of the motor, as a function of time t.

Naturally, for a motor that is fed by a single inverter, the output current of the inverter will be identical to the input current of the motor fed by this inverter.

In a feed mode with several inverters, the output current of the inverter is added to the motor current.

As can be derived from the figures, the motor current $i_{mot}$ gets more evenly in multi-inverter mode, since the supply voltage is more sinusoidal.

Without any restriction whatsoever, the present invention can also be applied to electric drives with windings having several layers. In this case, it is not necessary but it is possible to connect the parallel windings, since the parallel windings are coupled to the same motor flux. Consequently, also the voltage drop of the parallel windings will be equal.

According to the invention, the above-mentioned load that is connected to the differential-mode devices may consist of every type of passive or active load, such as a motor, a generator, a power supply net or the like.

Consequently, the method according to the invention is not restricted to the application for electric drives; on the contrary, such a method appears to be particularly well fit for compressor drive applications.

According to a special characteristic, the method according to the present invention is applied to high-speed applications and/or to active front end and/or active filter applications.

According to the invention, the above-mentioned differential-mode device can be at least partly provided in the housing of a power electronic inverter.

Moreover, such a differential-mode device according to the invention can be partly formed of the windings of an electric machine and/or it may be partly formed of the laminated core of an electrical machine.

Nor is it excluded, according to the invention, for the differential-mode device to be made in the form of one or several windings that are provided round an iron core round which are also provided windings of another differential-mode device feeding another phase.

The present invention is by no means restricted to the method and device given by way of example and represented in the accompanying drawings; on the contrary, such a method and device according to the invention can be made in all sorts of ways while still remaining within the scope of the invention.

The invention claimed is:

1. Method for controlling a load with a predominantly inductive character, comprising feeding a phase of the load by using at least two switched output voltages, derived from one or several power electronic inverters, with a given switching, modulation or sampling period, wherein waveforms of the output voltages are different or have been shifted in time, and are supplied to the load via a differential-mode device, whereby during every complete period, at least one of the output voltages is maintained constant and thus is not switched.

2. Method according to claim 1, wherein during every complete period, maximally one of the output voltages is switched.

3. Method according to claim 1, wherein the load is supplied in the form of a polyphase load and several phases of this load are each fed via a differential-mode device.

4. Method according to claim 1, wherein the output voltages are within the low modulation range and a common-mode voltage is added to every phase, so that during every period, in every phase, maximally one inverter leg changes its output voltage, and all other inverter legs in such phase remain continuously switched as "high".

5. Method according to claim 1, wherein the output voltages are in the low modulation range and a common-mode voltage is added to every phase, such that during every period, in every phase, maximally one inverter leg changes its output voltage, and all the other inverter legs in such phase remain continuously switched as "low".

6. Method according to claim 1, wherein several power electronic inverters are used and said power electronic inverters are fed by a common DC bus voltage.

7. Method according to claim 1, wherein several power electronic inverters are used and not all said power electronic inverters are connected to the same DC bus voltage.

8. Method according to claim 1, including using the method for electrical drive applications.

9. Method according to claim 1, including varying the method for high-speed applications.

10. Method according to claim 1, including using the method for compressor drive applications.

11. Method according to claim 1, including using the method for active front end and/or active filter applications.

12. Device for using the method according to claim 1 to control a load with a predominantly inductive character, comprising one or several power electronic inverters having a given switching, modulation or sampling period, arranged to supply at least two switched output voltages, and at least one differential-mode device to which the inverter or inverters is or are connected to feed a phase of the load, wherein the inverter or inverters comprise a control that makes the waveforms of the output voltages concerned different or shifted in time, so that during every complete period, at least one of the output voltages is maintained constant and thus is not switched.

13. Device according to claim 12, wherein the differential-mode device includes one or several inductor components exemplified by chokes, transformers, toroids, ferrite rings, iron cores, "common-mode" chokes, and current-compensated chokes, having two or several parallel windings, such that damping of the differential-mode of the voltage, current respectively, of two or more inverter legs connected to the differential-mode device is enabled.

14. Device according to claim 12, wherein the differential-mode device is partly formed of the windings of an electric machine.

15. Device according to claim 12, wherein the differential-mode device is partly formed of the laminated core of an electric machine.

16. Device according to claim 12, wherein the differential-mode device comprises windings around an iron core with more than one magnetic flux path.

17. Device according to claim 12, wherein the differential-mode device is equipped with one or several windings, provided around an iron core around which are also provided windings of another differential-mode device feeding another phase.

18. Device according to claim 12, wherein the differential-mode device is at least partly provided in the housing of the inverter.

* * * * *